US010042155B2

(12) United States Patent
Arbouzov (10) Patent No.: US 10,042,155 B2
(45) Date of Patent: Aug. 7, 2018

(54) MODULAR CAMERA ATTACHMENT FOR OPTICAL DEVICES

(71) Applicant: Ivan Arbouzov, Mansfield, TX (US)

(72) Inventor: Ivan Arbouzov, Mansfield, TX (US)

( * ) Notice: Subject to any disclaimer, the term of this patent is extended or adjusted under 35 U.S.C. 154(b) by 0 days.

(21) Appl. No.: 15/536,527

(22) PCT Filed: Dec. 16, 2015

(86) PCT No.: PCT/US2015/066093
§ 371 (c)(1),
(2) Date: Jun. 15, 2017

(87) PCT Pub. No.: WO2016/100513
PCT Pub. Date: Jun. 23, 2016

(65) Prior Publication Data
US 2017/0363855 A1    Dec. 21, 2017

Related U.S. Application Data

(60) Provisional application No. 62/092,383, filed on Dec. 16, 2014.

(51) Int. Cl.
*G02B 23/18* (2006.01)
*G02B 27/62* (2006.01)
(Continued)

(52) U.S. Cl.
CPC .............. *G02B 23/18* (2013.01); *G01B 11/27* (2013.01); *G01C 15/002* (2013.01);
(Continued)

(58) Field of Classification Search
CPC ................ A61N 5/1049; A61N 5/1048; A61N 2005/1061; A61N 5/1065; A61N 2005/1054; A61N 5/1045; A61B 5/0035
See application file for complete search history.

(56) References Cited

U.S. PATENT DOCUMENTS 9,157,701 B2 * 10/2015 Varshneya .............. F41G 3/165
2003/0048355 A1    3/2003 Shimoyama et al.
(Continued)

OTHER PUBLICATIONS

International Search Report and Written Opinion of the International Searching Authority issued in International Application No. PCT/US2015/066093 dated Mar. 4, 2016; 11 pages.

*Primary Examiner* — Trung Diep
(74) *Attorney, Agent, or Firm* — Fish & Richardson P.C.

(57) ABSTRACT

The present disclosure describes methods, systems, and computer program products for a modular camera attachment for optical devices and its use. One computer-implemented method includes linking a modular camera accessory (MCA) to a smart device using a data connection; activating the application on the smart device for a collimation function between the MCA and a modular camera attachment-enabled optical (MCO) device; receiving collimation data from the MCA and a camera of the smart device configured to capture collimation data from the optical path of the MCO device; processing the collimation data received from the MCA and the MCO device to determine alignment indicators; using the determined alignment indicators, aligning the MCA with the MCO device optical characteristics; and activating the application on the smart device to process data received from the MCA.

21 Claims, 5 Drawing Sheets

(51) Int. Cl.
  *G02B 23/14*  (2006.01)
  *G01B 11/27*  (2006.01)
  *G02B 6/42*  (2006.01)
  *G01C 15/00*  (2006.01)

(52) U.S. Cl.
  CPC ............ *G02B 6/4206* (2013.01); *G02B 23/14* (2013.01); *G02B 27/62* (2013.01)

(56) References Cited

U.S. PATENT DOCUMENTS

| | | |
|---|---|---|
| 2011/0131824 A1 | 6/2011 | Yanobe et al. |
| 2011/0210261 A1* | 9/2011 | Maurer, Jr. .............. A61N 5/10 250/393 |
| 2013/0250284 A1 | 9/2013 | Lienhart et al. |
| 2016/0023019 A1* | 1/2016 | Filiberti ............... A61N 5/1075 600/1 |
| 2017/0041500 A1* | 2/2017 | Kuboyama .......... H04N 1/3876 |

* cited by examiner

MODULAR CAMERA ATTACHMENT FOR OPTICAL DEVICES

CLAIM OF PRIORITY

This application is a U.S. National Stage of PCT/US2015/066093, filed on Dec. 16, 2015, which claims priority to U.S. Provisional Application No. 62/092,383, filed on Dec. 16, 2014, the entire contents of which are hereby incorporated by reference.

BACKGROUND

Currently in the field of camera-enabled optics (e.g., binoculars, telescopes, spotting scopes, firearm scopes, etc.), typical camera-enabled optical devices are limited by characteristics of each particular system (e.g., optical characteristics of the underlying optical system, limitations associated with the integrated camera, etc.) and may be limited in overall performance and/or not satisfy user requirements. Some camera-enabled optical device models are inexpensive and provide low-quality results both optically and as a camera, while others are expensive, but the high-quality camera is then limited to uses with the associated optical system and desired overall results may still not be achieved.

Data from a camera in a camera-enabled optical device is typically recorded to a built-in/internal memory without the ability to automatically backup or transfer the data (e.g., to a mobile or other device for additional viewing, processing, etc.). This makes working with recorded data inefficient. When wishing to record what is visible through an optical device, eyepiece attachments coupled to the optical device can be beneficial but can interfere with normal usability of the optical device unless the eyepiece attachment is removed.

SUMMARY

The present disclosure describes a modular camera attachment for optical devices.

A modular camera accessory (MCA) is linked to a smart device using a data connection. An application is activated on the smart device for a collimation function between the MCA and a modular camera attachment-enabled optical (MCO) device. Collimation data is received from the MCA and a camera of the smart device configured to capture collimation data from the optical path of the MCO device. The collimation data received from the MCA and the MCO device is processed to determine alignment indicators. The MCA is aligned with the MCO device optical characteristics using the determined alignment indicators. The application is activated on the smart device to process data received from the MCA.

Other implementations of this aspect can include corresponding computer systems, apparatuses, and computer programs recorded on one or more computer-readable media/storage devices, each configured to perform actions of methods associated with the described modular camera attachment for optical devices. A system of one or more computers can be configured to perform particular operations or actions by virtue of having software, firmware, hardware, or a combination of software, firmware, or hardware installed on the system that in operation causes the system to perform the actions. One or more computer programs can be configured to perform particular operations or actions by virtue of including instructions that, when executed by data processing apparatus, cause the apparatus to perform the actions.

For example, one computer-implemented method includes linking a modular camera accessory (MCA) to a smart device using a data connection; activating an application on the smart device to perform a collimation function between the MCA and a modular camera attachment-enabled optical (MCO) device; receiving collimation data from the MCA and a camera of the smart device configured to capture collimation data from the optical path of the MCO device; processing the collimation data received from the MCA and the MCO device to determine alignment indicators; using the determined alignment indicators, aligning the MCA with the MCO device optical characteristics; and activating the application on the smart device to process data received from the MCA.

The foregoing and other implementations can each optionally include one or more of the following features, alone or in combination:

A first aspect, combinable with the general implementation, wherein the data connection is one of phone, network, BLUETOOTH, and WIFI.

A second aspect, combinable with any of the previous aspects, wherein the smart device is a mobile telecommunications device.

A third aspect, combinable with any of the previous aspects, wherein the alignment indicators include a visual dot or grid in the collimation data used to align an MCA optical axis with optics of the MCO device.

A fourth aspect, combinable with any of the previous aspects, comprising the application performing intelligent image processing to perform automatic adjustment of the MCA to match the optical characteristics of the MCO device.

A fifth aspect, combinable with any of the previous aspects, comprising controlling a motorized collimation mount to modify the alignment of the MCA.

A sixth aspect, combinable with any of the previous aspects, comprising the application recording received MCA data on the smart device.

The subject matter described in this specification can be implemented in particular implementations so as to realize one or more of the following advantages. First, the use of the MCA in conjunction with the MCO can result in better overall images, audio, and/or other data received by the MCA. For example, the MCO can be used to properly spot and orient the MCA to receive image, audio, and/or other data. Second, an MCA ergonomically attached to the body of and visually collimated with an MCO device can, in some implementations, have a detachable/replaceable sensor unit to provide camera data (e.g., video, still, thermal, range finding, audio, and/or other data). Third, the camera data can be recorded by the MCA and transmitted in real time (e.g., by phone, network, BLUETOOTH, WIFI, and/or other transmission means consistent with this disclosure) to other computing devices (e.g., a smart/mobile device, server, etc.) and/or to a centralized processing center (e.g., data center, server farm, command center, etc.) for a particular task (e.g., recording, processing, manipulation, augmentation, re-broadcast, etc.). Fourth, the transmitted MCA data can allow simultaneous viewing by a user separate from the operator of the MCO device/MCA, etc. In some implementations, the camera data from the MCA can be fed into a smart device (such as a mobile phone, tablet, head-mounted smart device such as GOOGLE GLASS or similar processing unit worn/carried by a user of the MCO device/MCA, etc.). This provides the ability to see/hear data and images from the MCA (which has typically been configured/aligned to correlate with the visual field-of-view (FOV) of the MCO device) and the use of the display/processing capabilities of the smart device for possible data manipulation, enhancement, etc. Fifth, in some implementations, an image from the MCA can be overlaid by other data permitting an augmented/enhanced view of an object (e.g., Global Positioning System (GPS) positioning data, compass, audio, etc.). This other data can be obtained from functionality associated with the MCA, MCO device (configured to communicate with the MCA or other device), or an available smart device that can communicate data to the MCA or augment/enhance received MCA data on the smart device. The augmented/enhanced data can be displayed on either the MCO device (with appropriate configured display means to render the data in the MCO device) and/or a separate device—such as a mobile computing or other device. Sixth, the MCA can, in some implementations, be detached from the MCO device and used independently for other useful purposes (e.g., surveillance, action camera, etc.) without functionality provided by the MCO device. Seventh, a microphone integrated into/used with the MCA can be used to issue voice commands to the MCA and/or attached smart device. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter and is provided in the context of one or more particular implementations. Various modifications to the disclosed implementations will be readily apparent to those skilled in the art, and the general principles defined herein may be applied to other implementations and applications without departing from the scope of the disclosure. Thus, the present disclosure is not intended to be limited to the described and/or illustrated implementations but is to be accorded the widest scope consistent with the principles and features disclosed herein.

At a high level, what is described is a modular camera attachment (MCA) ergonomically attached to the body of and visually collimated with a modular camera attachment-enabled optical (MCO) device. The MCA is used to enhance observational optical devices (e.g., binoculars and scopes) acting as MCO devices with additional features/functionality (e.g., wireless connectivity with a smart device such as a mobile phone, an auxiliary or built-in microphone to allow voice commands and to record distant sounds of an observed object and/or voice comments by the observer, etc.). The MCA can, in some implementations, have a detachable/replaceable sensor unit to provide camera data (e.g., video, still, thermal, range finding, audio, and/or other data). The data can be recorded by the MCA and transmitted in real time (e.g., by phone, network, BLUETOOTH, WIFI, and/or other transmission means consistent with this disclosure) to other computing devices (e.g., a smart/mobile device, server, etc.) and/or to a centralized processing center (e.g., data center, server farm, command center, etc.) for a particular task (e.g., recording, processing, manipulation, augmentation, re-broadcast, etc.). The transmitted MCA data can allow simultaneous viewing by a user separate from the operator of the MCO device/MCA, etc. In some implementations, the camera data from the MCA can be fed into a smart device (such as a mobile phone, tablet, head-mounted smart device such as GOOGLE GLASS or similar processing unit worn/carried by a user of the MCO device/MCA, etc.). This provides the ability to see/hear data and images from the MCA (which has typically been configured/aligned to correlate with the visual field-of-view (FOV) of the MCO device) and the use of the display/processing capabilities of the smart device for possible data manipulation, enhancement, etc. In some implementations, an image from the MCA can be overlaid by other data permitting an augmented/enhanced view of an object (e.g., Global Positioning System (GPS) positioning data, compass, audio, etc.). This other data can be obtained from functionality associated with the MCA, MCO device (configured to communicate with the MCA or other device), or an available smart device that can communicate data to the MCA or augment/enhance received MCA data on the smart device. The augmented/enhanced data can be displayed on either the MCO device (with appropriate configured display means to render the data in the MCO device) and/or a separate device—such as a mobile computing or other device. In some implementations, the MCA can be detached from the MCO device and used independently for other useful purposes (e.g., surveillance, action camera, etc.) without functionality provided by the MCO device.

Figure 1:
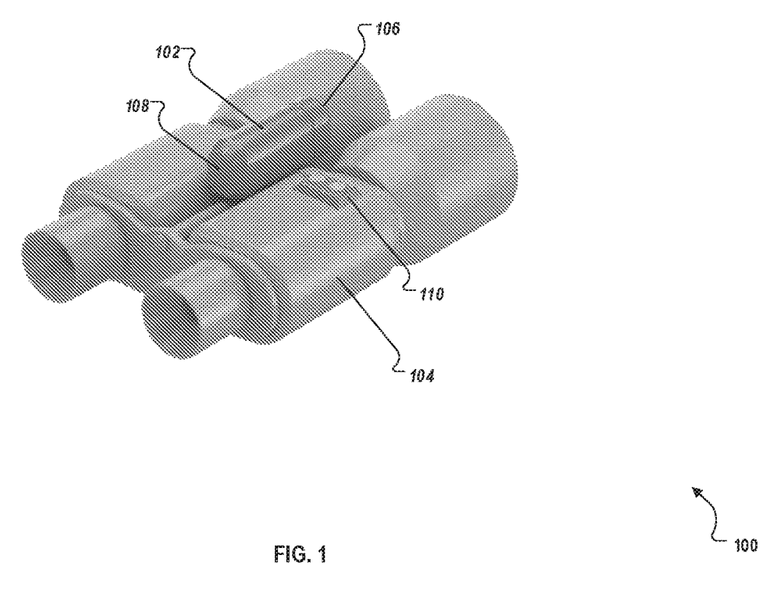
FIG. 1 illustrates a perspective view of a modular camera attachment (MCA) for modular camera attachment-enabled optical (MCO) devices according to an implementation.

FIG. 1 illustrates a perspective view 100 of a modular camera attachment (MCA) 102 for a modular camera attachment-enabled optical (MCO) device 104 according to an implementation. In typical implementations, the MCA is configured to record images and audio video in combination with an MCO device 104 and/or other accessories. Note that while the MCA 102 is illustrated in a particular example configuration in FIGS. 1-3, the MCA is not limited by the illustrated implementation. In other implementations, the MCA 102 could be configured to be a different shape, size, etc. For example, the MCA 102 could be configured to be more of a flat, rectangular shape similar to commonly available "action"-type cameras such as the GOPRO HERO, etc. In other implementations, the MCA 102 could be custom configured for a particular MCO device 104 to conform smoothly to configured shapes of the MCO device 104 to provide a streamlined/integrated-type look. As will be apparent to those of ordinary skill in the art, there are many possible configurations of the MCA 102 consistent with this disclosure. These other configurations are considered to be within the scope of this disclosure. Similarly, while the MCO device 104 is illustrated in a particular example configuration (e.g., a binoculars), the MCO device 104 is not limited by the illustrated configuration. As will also be apparent to those of ordinary skill in the art, there are many possible configurations of the MCO device 104 consistent with this disclosure (e.g., binoculars, telescopes, spotting scopes, firearm scopes, etc.). These other configurations are also considered to be within the scope of this disclosure.

In typical implementations, the MCA 102 includes high-magnification objective lens 106, power supply 108, control assembly 110, MCO device mount 112 (not illustrated—see FIG. 3) designed to be ergonomically attached to the body of the MCO device 104, a collimation mount 114 (not illustrated—see FIG. 3), digital sensor(s) 116 (not illustrated in FIG. 1), processor/control board 118 (not illustrated in FIG. 1), memory 120 (not illustrated in FIG. 1), interface 122 (not illustrated in FIG. 1) (e.g., a wireless or other transmission unit). In some implementations, the MCA 102 also includes a microphone 124 (not illustrated in FIG. 1). In some implementations, the microphone 124 can be configured into the MCA 102 and have a small opening in the MCA 102 housing to receive audio data to be recorded/transmitted. In other implementations, the microphone 124 can also provide an auxiliary connector (see below regarding connectors) to attach a separate higher sensitivity/directional microphone to the MCA 102/MCO device 104 or to an external support such as a tripod, hand-held microphone support, etc. In some implementations, the microphone 124 can be used to issue voice commands to the MCA and/or an attached smart device to control operation/functionality (even some or all of that provided by the control assembly 110 described below).

In other implementations, the MCA 102 can contain other instruments/sensors to provide/receive data to augment visual and/or audio data obtained by the digital sensor 116 and/or microphone 124. For example, the other instruments/sensors can include a GPS receiver/transmitter, clock, an accelerometer, a gyroscopic sensor, compass, wireless radio, temperature/pressure sensor, humidity, altimeter, lighting intensity sensor, laser rangefinder, and/or other instruments/sensors.

In some implementations, the MCA 102 can contain various connectors (not illustrated) to allow it to be attached to the control assembly 110, external power supplies, computing equipment (such as a smart device), memory storage devices, and/or the above described instruments/sensors, etc. For example, the various connectors can include USB (and variants), SD/microSD memory card slots, CF memory card slot, FIREWIRE, LIGHTNING, RCA, 3.5 mm audio, HDMI, component, and/or other types of connectors consistent with this disclosure.

The high-magnification objective lens 106 is configured to attach to the housing of the MCA 102 (generally indicated as label 102) and to face in the direction of the objective optics of the MCO device 104 in order to "view" the same or similar FOV as most observational optical systems acting as the MCO device 104. In other words, the objective lens 106 can be selected/used to "match" (as closely as possible) the magnification and FOV of the MCO device 104.

In some implementations, the objective lens 106 is separate from and covers/protects the digital sensor(s) 116 integrated into the MCA 102 housing. In other implementations, the objective lens 106 and digital sensor(s) 116 are combined into a single unit (e.g., a "camera unit").

In some implementations, the objective lens is interchangeable depending on the purposes of the MCA (e.g., higher needed magnification, type of visual data desired, etc.). For example, in some implementations, the objective lens 106 can be configured of a material transparent to visible radiation but opaque to infrared (IR) radiation. In other implementations, the objective lens 106 can be configured of a material transparent to infrared IR radiation such as in thermal imaging systems. In some implementations, objective lens 106 can be configured of Germanium (Ge), quartz, AMTIER, barium fluoride, calcium fluoride, sodium chloride, CLEARTRAN, fused silica, silicon, polyethylene, IR transparent ceramics, and/or any other type of substance transparent to infrared electromagnetic radiation. In some implementations, the objective lens 106 can be made of a substance transparent to both optical and IR radiation wavelengths (e.g., quartz, polyethylene, etc.). In some implementations, the objective lens 106 and digital sensor(s) 116 associated with the MCA 102 can be removed and replaced within the MCA 102 housing to change overall functionality without needing a separate MCA unit.

In some implementations, the objective lens 106 focus is fixed. In other implementations, the object lens 106 can contain a focusing assembly (e.g., operated by the control assembly 110, an application executing on a linked smart device, etc.). In some implementations, the objective lens 106 is configured to provide optical zoom functionality (e.g., operated by the control assembly 110, an application executing on a linked smart device, etc.).

In implementations where the objective lens 106 and digital sensor(s) 116 are combined into a single unit (e.g., a "camera unit"), the camera unit can be removed as a unit from the MCA 102. For example, one camera unit could be useful for up-close night vision viewing of animals, while another camera unit could be useful for longer-range, visible light/daylight viewing. A user could just swap the camera unit on the MCA 102 depending on desired usage and place the other in storage.

The power supply 108 provides power to the MCA 102. In some implementations, the power supply is a battery (either rechargeable or non-rechargeable—such as a 123A, CR2032, AA, AAA, etc.) that is installed under a removable cap (e.g., pop-off, screw-type, etc.) configured into the MCA 102 housing (not illustrated). In some implementations, the MCA 102 can be connected to an external power supply (see above with respect to connectors) to either power the MCA 102 and/or recharge power supply 108 (e.g., if a rechargeable battery). The processor/control board 118 can be configured to determine whether power supply 108 is a rechargeable battery and control recharging functionality if appropriate power is supplied. In some implementations, the power supply can draw power from the MCO device 104 if connected to a power-producing connector on the MCO device 104. In some implementations, the MCA 102 can have an indicator (e.g., LED, audio chirp, and/or other visual/audio indicator) that the power supply 108 is discharged. In some implementations, the MCA 102 can transmit data to a smart device to display a message to a user that the power supply 108 is discharged and needs replacement/recharging.

The control assembly 110 can be used to control various functionality associated with the MCA 102. Although illustrated as two buttons attached (e.g., by an adhesive strip) to a housing of the MCO device 104, those of ordinary skill in the art will appreciate that the control assembly 110 can be configured in a multitude of ways to provide described functionality. These other configurations are considered to be within the scope of this disclosure. For example, the control assembly 110 could be configured to be buttons, switches (e.g., mylar, sliding, toggle, etc.), a touch-sensitive surface, etc. In other implementations, the control assembly 110 may not be a separate control assembly 110, but the functionality of the control assembly 110 can be integrated into an application executing on a linked external smart device (e.g., a smart phone, table computer, etc.). In typical implementations, the control assembly 110 controls, for example, MCA 102 power ON/OFF, camera zoom functionality, MCA 102 optical path alignment/adjustment, switching between day/night vision functionality, enabling/disabling a link to an external smart device, etc.

As mentioned above, in some implementations, the MCA 102 is detachable from the MCO device 104. When separated, the MCA 102 can be used independently for other useful purposes (e.g., surveillance, action camera, etc.) without functionality (and weight/bulk) provided by the MCO device 104. When separated, the MCA 102 can still be linked to a smart device (or other device) using a network connection. For example, in a surveillance situation, the MCA 102 could be disconnected from the MCO device 104 and held in a user's hand to view around/above a wall, provide a view of a tight space that the MCO device 104 would not have fit into, be used covertly when the MCA 102/MCO device 104 combination would have been obvious, etc. In some implementations, the MCA 102 can be attached to a smart device to perform as, for example, a high-quality special application or auxiliary camera with directional sound amplification capabilities compared to the smart device's built-in camera/microphone.

Figure 2:
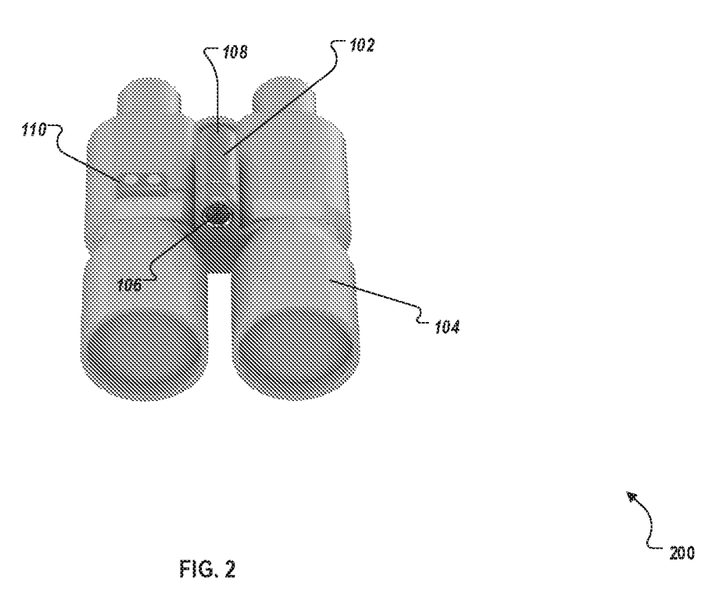
FIG. 2 illustrates a different perspective view of the MCA and MCO device of FIG. 1 according to an implementation.

FIG. 2 illustrates a different perspective view 200 of the MCA 102 and MCO device 104 of FIG. 1 according to an implementation. FIG. 2 also illustrates a view of the MCA 102 objective lens 106 and MCO device 104 objective optics not visible in perspective of FIG. 1.

Figure 3:
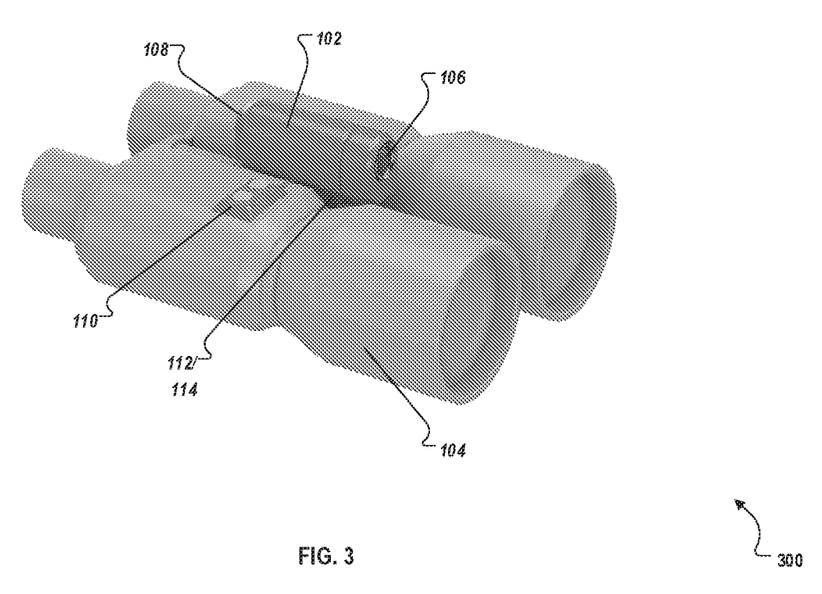
FIG. 3 illustrates another perspective view of the MCA and MCO device of FIGS. 1 and 2 according to an implementation.

FIG. 3 illustrates another perspective view 300 of the MCA 102 and MCO device 104 of FIGS. 1 and 2 according to an implementation. FIG. 3 also illustrates an MCO device mount 112 designed to be ergonomically attached to the body of the MCO device 104 and a collimation mount 114 permitting alignment of the MCA 102 optical axis with the MCO device 104 optics with the help of an application executing on a smart device.

The MCO device mount 112 is designed to attach to various types of MCO devices 104. For example, the MCO device mount 112 could be configured with adjustable clamps, supports, brackets, etc. to allow it to be "fit" securely and ergonomically to various types of binocular, telescope, spotting scope, rifle scope, etc. designs. As illustrated in FIG. 3, the MCA 102 is attached to the central rotational axis/hinge for both halves of the binocular MCO device 104. In this implementation (although not specifically illustrated), a clamp could be attached and tightened around the axis/hinge to secure the MCA 102 in place. In some implementations, securing tape/adhesives can also be used. As will be apparent to those of ordinary skill in the art, there are a multitude of possible MCO device 104 configurations, and the example binocular MCO device 104 is provided to help the reader understand the intention behind the MCO device mount 112. While not specifically illustrated, variations of mechanisms to secure the MCA 102 to a MCO device 104 are considered to be within the scope of this disclosure at least to the degree that the MCA 102 is to be securely and ergonomically attached to the MCO device 104.

The collimation mount 114 is used to align the MCA 102 optical axis with the MCO device 104 optics with the help of an application executing on a smart device. For example, in some implementations, the collimation mount 114 can be configured to couple to the MCO device mount 112 (acting as a secure base for the collimation mount 114) using, for example, screws, clamps, adhesive, pins, etc. The MCA 102 then attaches to the MCO device mount 112, with the MCO device mount 112 permitting elevation/windage-type adjustments of the attached MCA 102. The collimation mount 114 can be configured to be adjusted in various ways (e.g., manual screw elevation/windage-type adjustments, push buttons to move the mount left/right and up/down, a manual lock/unlock type adjustment, a motorized-type mount that can be driven by an application executing on a smart device, the control assembly 110, voice commands, etc.).

As an example of an application-driven collimation method, a user can link the MCA 102 to a smart device application providing collimation configuration. The user can then take the smart device and align (hold or mount) the smart device camera with the eyepiece of the MCO device 104 (possibly using a mounting bracket to hold the MCA 102 securely and in proper alignment with the MCO device 104 optical path). The application executing on the smart device can then show a side-by-side or overlapping visual image of the MCO device 104 optical path and the MCA 102 optical path and allow the user to align the two using the collimation mount 114. For example, the application could show a visual dot, grid, and/or other alignment indicator in each visual image, and the user could then simply move the alignment of the dots/alignment indicators to overlap (e.g., with a manual adjustment using the above-mentioned adjustment types). The application could also allow the user to zoom/focus the MCA 102 system to match the FOV, zoom, focus, etc. of the MCO device 104 optical path. In some implementations, the application can perform intelligent image processing (pixel/image analysis/matching, etc.) and perform an automatic adjustment of the MCA 102 to match the optical characteristics of the MCO device 104 (e.g., using a motorized collimation mount 114) to automatically set/lock the proper position of the MCA, zoom/focus the objective lens 106, etc.

While the prior discussion of the MCO device mount 112 and collimation mount 114 has described them as separate mounts or a combined mount external to the MCA 102 housing, in other implementations, the MCO device mount 112 and the collimation mount 114 functionality can be integrated as part of and within, respectively, the MCA 102 housing. For example, to collimate the MCA 102 (attached to the MCO device 104 by the configured MCA 102 housing), a collimation mechanism internal to the MCA 102 housing can move/orient the digital sensor(s) 116, objective lens 106 and/or other applicable components (combined in some implementations as complete camera unit) using the application. In this implementation, the MCA 102 housing would remain stationary while the MCA 102 optical components can move within the MCA 102 housing (either by manual or automated means as described above—e.g., screws, motorized functionality, etc.). In still another implementation, the MCO device 112 mount can be external to and attached to the MCO device 104 and to the MCA 102 housing to secure the MCA 102 to the MCO device 104 while the collimation mount 114 functionality can be integrated into the MCA 102 housing as described immediately preceding.

Figure 4:
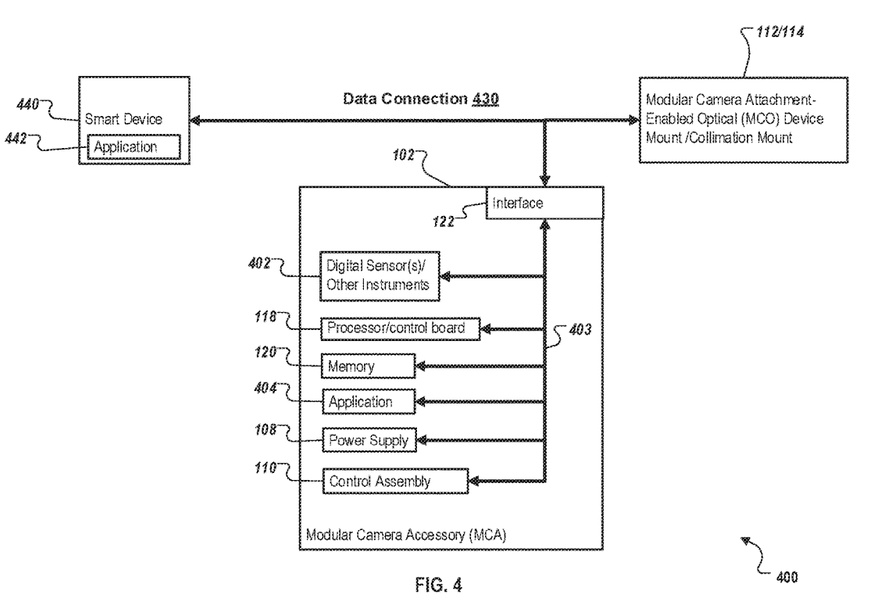
FIG. 4 is a block diagram illustrating components of an example distributed computing system (EDCS) including an MCA according to an implementation.

FIG. 4 is a block diagram 400 illustrating components of an example distributed computing system (EDCS) including an MCA 102 according to an implementation. The illustrated system includes or is communicably coupled with an MCA 102, smart device 440, and MCO device mount 112/collimation mount 114 (as described above) that communicate across a data connection 430. (Note that MCO device mount 112 is included with collimation mount 114 as they are typically coupled, but it is understood that MCO device mount 112 is typically "dumb" and does not communicate using the data connection 430. In some implementations, however, the MCO device mount 112/collimation mount 114 can be one combined unit.) In some implementations, one or more components of the EDCS system may be configured to operate in conjunction with other MCAs 102/MCO devices 104, smart devices 440, and/or MCO device mounts 112/collimation mounts 114.

At a high level, the MCA 102 is an electronic computing device operable to process data and information associated with the EDCS. The MCA 102 is typically mounted in an optically collimated manner with an MCO device 104 as described above. As will be apparent to those of ordinary skill in the art, MCA 102 can also contain necessary non-illustrated control/processing circuitry and/or other components to permit the above-described functionality/operation(s). In typical implementations, the MCA 102 includes an interface 122, processor/control board 118, memory 120, application 404, power supply 108 (as described above), control assembly 110 (as described above), and digital sensor(s)/other instruments 402.

The MCA 102 is typically responsible for receiving, processing, generating, and/or transmitting visual, audio, and/or other data to transmit to the smart device 440 (e.g., using interface 122). In some implementations, data can also be to received by/transmitted to any other device in the EDCS, including other instances of the MCA 102, MCO device 104, smart device 440, and/or MCO device mounts 112/collimation mounts 114. For example, one smart device 440 can be designated as a "controller" and receive data from multiple MCAs 102 (and/or other elements of the EDCS) to more accurately represent video, audio, and/or other data.

Each of the components of the MCA 102 can communicate using a system bus 403. In some implementations, any and/or all the components of the MCA 102, both hardware and/or software, may interface with each other and/or the interface 122 over the system bus 403 using an application programming interface (API), service layer, or the like (neither illustrated). The API may include specifications for routines, data structures, and object classes. The API may be either computer language-independent or -dependent and refer to a complete interface, a single function, or even a set of APIs. The service layer provides software services to the EDCS. The functionality of the MCA 102 may be accessible for all service consumers using this service layer. Software services, such as those provided by the service layer, provide reusable, defined business functionalities through a defined interface. For example, the interface may be software written in JAVA, C++, or other suitable language providing data in extensible markup language (XML) format or other suitable format. Any or all parts of the API and/or the service layer may be implemented as child or sub-modules of another software module without departing from the scope of this disclosure. For example, the API could be integrated into the application 404.

Although illustrated as a single interface 122 in FIG. 4, two or more interfaces 122 may be used according to particular needs, desires, or particular implementations of the EDCS. The interface 122 is used by the MCA 102 for communicating with other elements of the EDCS and/or other elements of other EDCSs using data connection 430. Generally, the interface 122 comprises logic encoded in software and/or hardware in a suitable combination and operable to communicate with the data connection 430. More specifically, the interface 122 may comprise software supporting one or more communication protocols associated with communications such that the data connection 430 or data connection 430 hardware is operable to communicate physical signals within and outside of the illustrated EDCS. The data connection can include a wireless network (e.g., cellular, WIFI, to BLUETOOTH, etc.) and/or direct physical connection (e.g., cable, etc.).

The MCA 102 includes a processor/control board 118. Although illustrated as a single processor/control board 118 in FIG. 1, two or more processor/control boards 118 may be used according to particular needs, desires, or particular implementations of the EDCS. The processor/control board 118 executes instructions and manipulates data to perform the operations/functions of the MCA 102. For example, the processor/control board 118 can execute functionality to process and transmit data from the MCA 102 to the smart device 440.

The MCA 102 also includes a memory 120 that holds data for the MCA 102. Although illustrated as a single memory 120 in FIG. 4, two or more memories may be used according to particular needs, desires, or particular implementations of the EDCS. While memory 406 is illustrated as an integral component of the MCA 102, in alternative implementations, memory 120 can be external to the MCA 102 and/or the EDCS. In some implementations, memory 120 can be configured to store, for example, one or more instances of user profiles, communication data, target object data, recorded audio/video data, applications, and/or other appropriate data.

In some implementations, memory 120 can include an external memory device (e.g., an SD card, USB flash drive, etc.) to store audio, visual, and/or other data. For example, the memory 120 can be used by the MCA 102 to perform necessary processing associated with the MCA 102 while an external memory device attached to the MCA 102 (see above with respect to connector) can serve as a backup, cache, temporary, and/or permanent data storage.

The application 404 is a software calculation engine providing, among other things, functionality related to operations of the MCA 102 and/or functionality associated with the smart device 440, and/or the MCO device mount 112/collimation mount 114. For example, application 404 can be a downloadable/upgradeable application (or firmware) installed on the MCA 102. The application 404 can also allow for configuration of the MCA 102 (e.g., using the smart device 440 as an interface or using a built in display menu (not illustrated)), receiving and processing data (e.g., from the digital sensor/other instruments 402—such as the objective lens 106/digital sensor(s) 116), transmitting the data to the smart device 440 and/or collimation mount 114, etc.

Although illustrated as a single application 404, the application 404 may be implemented as multiple applications 404. In addition, although illustrated as integral to the MCA 102, in alternative implementations, the application 404 can be external to the MCA 102 and/or the EDCS (e.g., wholly or partially executing on a different implementation of another MCA 102 (not illustrated), etc.).

Digital sensor/other instruments 402 can include various hardware and/or software instruments to collect data to make available to the application 404. For example, digital sensor/other instruments 402 can include objective lens 106 and digital sensor(s) 116 as described above. In some implementations, digital sensor/other instruments 402 can also include various types of digital camera(s) (including thermal, IR, etc.), a GPS receiver/transmitter, clock, an accelerometer, a gyroscopic sensor, compass, wireless radio, temperature/pressure sensor, humidity, altimeter, lighting intensity sensor, laser rangefinder, and/or other instruments/ sensors (including those described above with respect to FIG. 1) suitable for the purposes of the EDCS.

The application 442 associated with the smart device 440 is a software calculation engine providing, at a high level, an interface to interact with and control the smart device 440, MCA 102, and/or MCO device mount 112/collimation mount 114. For example, application 442 can be a downloadable/upgradeable application installed on the smart device 440. The application 442 can, as described above, provide functionality to collimate the MCA 102 with the MCO device 104 optical path and/or process/display data received from the MCA 102, collimation mount 114, and/or other component of the EDCS or other EDCSs (including from other MCAs 102, smart devices 440, etc.).

Although illustrated as a single application 404, the application 442 may be implemented as multiple applications 442. In addition, although illustrated as integral to the smart device 440, in alternative implementations, the application 442 can be external to the smart device 40 and/or the EDCS (e.g., wholly or partially executing on a different implementation of another smart device 440 and/or other device (not illustrated)).

Figure 5:
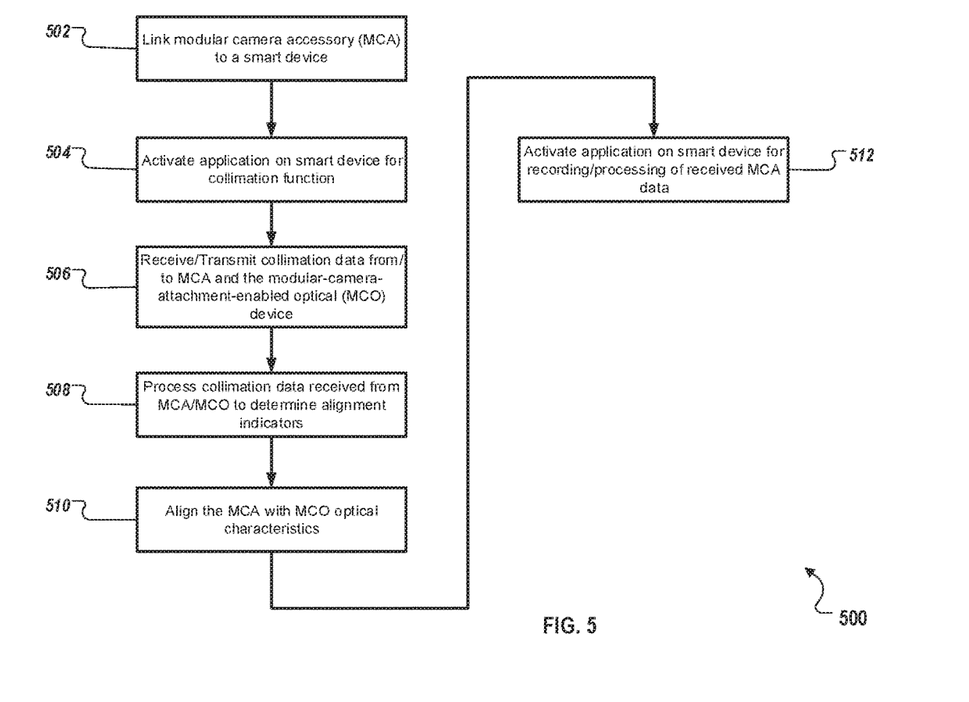
FIG. 5 is a flow chart of a method of use of an MCA with an MCO device and smart device according to an implementation.

FIG. 5 is a flow chart of a method of use of an MCA 102 according to an implementation.

For clarity of presentation, the description that follows generally describes method 500 in the context of FIGS. 1-4. However, it will be understood that method 500 may be performed, for example, by any other suitable system, environment, software, and hardware, or a combination of systems, environments, software, and hardware as appropriate. In some implementations, various steps of method 500 can be run in parallel, in combination, in loops, or in any order.

At 502, an MCA is linked to a smart device. For example, the MCA can be placed into discovery mode and linked to the smart device using BLUETOOTH. From 502, method 500 proceeds to 504.

At 504, an appropriate application is activated on the smart device to perform a collimation function. For example, the user can activate an optical collimation application for use with the MCA and MCO device to align the MCA optical axis with the MCO device optics. From 504, method 500 proceeds to 506.

At 506, collimation data is received/transmitted from/to the MCA. For example, the smart device application receives visual data from the MCA and overlays this data on visual data received from the smart device camera when aligned with the MCO device optical path. From 506, method 500 proceeds to 508.

At 508, the smart device application processes the MCA and MCO device collimation data and determines alignment indicators for adjustment. For example, the smart device application could show a visual dot, grid, and/or other alignment indicator in each collimation data visual image. From 508, method 500 proceeds to 510.

At 510, the smart device application is used to align the MCA with MCO device optical characteristics. In some implementations, the user could move the alignment of the dots/alignment indicators to overlap (e.g., with a manual adjustment using the above-mentioned adjustment types). The smart device application could also allow the user to zoom/focus the MCA system to match the FOV, zoom, focus, etc. of the MCO device optical path. In some implementations, the smart device application can perform intelligent image processing (pixel/image analysis/matching, etc.) and perform an automatic adjustment of the MCA to match the optical characteristics of the MCO device (e.g., using a motorized collimation mount) to automatically set/lock the proper position of the MCA, zoom/focus the objective lens, etc. From 510, method 500 proceeds to 512.

At 512, an application on the smart device is activated for recording/processing of received MCA data. For example, the user can set the MCA to send visual/audio data to the smart device application for image sharpening and to store associated audio data. The smart device application initiates display of the processed data on the smart device data display. Data can be displayed according to preset and/or dynamically determined preferences. After 512, method 500 stops. As will be appreciated by those of ordinary skill in the art, there are a multitude of possible functions that can be performed with data received by the smart device application. The example provided here is meant to be instructive and is not meant to be limiting in any way.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example, LINUX, UNIX, WINDOWS, MAC OS, ANDROID, IOS, or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface including, but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language-independent or -dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

What is claimed is:

1. A computer-implemented method comprising:
linking a modular camera accessory (MCA) to a smart device using a data connection;
activating an application on the smart device to perform a collimation function between the MCA and a modular camera attachment-enabled optical (MCO) device;
receiving collimation data from the MCA and a camera of the smart device configured to capture collimation data from the optical path of the MCO device;
processing the collimation data received from the MCA and the MCO device to determine alignment indicators;
using the determined alignment indicators, aligning the MCA with the MCO device optical characteristics; and
activating the application on the smart device to process data received from the MCA.

2. The computer-implemented method of claim 1, wherein the data connection is one of phone, network, BLUETOOTH, and WIFI.

3. The computer-implemented method of claim 1, wherein the smart device is a mobile telecommunications device.

4. The computer-implemented method of claim 1, wherein the alignment indicators include a visual dot or grid in the collimation data used to align an MCA optical axis with optics of the MCO device.

5. The computer-implemented method of claim 1, comprising the application performing intelligent image processing to perform automatic adjustment of the MCA to match the optical characteristics of the MCO device.

6. The computer-implemented method of claim 5, comprising controlling a motorized collimation mount to modify the alignment of the MCA.

7. The computer-implemented method of claim 1, comprising the application recording received MCA data on the smart device.

8. A non-transitory, computer-readable medium storing computer-readable instructions executable by a computer and configured to perform:
linking a modular camera accessory (MCA) to a smart device using a data connection;
activating an application on the smart device to perform a collimation function between the MCA and a modular camera attachment-enabled optical (MCO) device;
receiving collimation data from the MCA and a camera of the smart device configured to capture collimation data from the optical path of the MCO device;
processing the collimation data received from the MCA and the MCO device to determine alignment indicators;
using the determined alignment indicators, aligning the MCA with the MCO device optical characteristics; and
activating the application on the smart device to process data received from the MCA.

9. The non-transitory, computer-readable medium of claim 8, wherein the data connection is one of phone, network, BLUETOOTH, and WIFI.

10. The non-transitory, computer-readable medium of claim 8, wherein the smart device is a mobile telecommunications device.

11. The non-transitory, computer-readable medium of claim 8, wherein the alignment indicators include a visual dot or grid in the collimation data used to align an MCA optical axis with optics of the MCO device.

12. The non-transitory, computer-readable medium of claim 8, further comprising instructions for the application to perform intelligent image processing to perform automatic adjustment of the MCA to match the optical characteristics of the MCO device.

13. The non-transitory, computer-readable medium of claim 12, further comprising instructions to control a motorized collimation mount to modify the alignment of the MCA.

14. The non-transitory, computer-readable medium of claim 8, further comprising instructions for the application to record received MCA data on the smart device.

15. A computer-implemented system, comprising:
a hardware processor interoperably coupled with a computer memory and configured to perform:
linking a modular camera accessory (MCA) to a smart device using a data connection;
activating an application on the smart device to perform a collimation function between the MCA and a modular camera attachment-enabled optical (MCO) device;
receiving collimation data from the MCA and a camera of the smart device configured to capture collimation data from the optical path of the MCO device;
processing the collimation data received from the MCA and the MCO device to determine alignment indicators;
using the determined alignment indicators, aligning the MCA with the MCO device optical characteristics; and
activating the application on the smart device to process data received from the MCA.

16. The computer-implemented system of claim 15, wherein the data connection is one of phone, network, BLUETOOTH, and WIFI.

17. The computer-implemented system of claim 15, wherein the smart device is a mobile telecommunications device.

18. The computer-implemented system of claim 15, wherein the alignment indicators include a visual dot or grid in the collimation data used to align an MCA optical axis with optics of the MCO device.

19. The computer-implemented system of claim 15, further configured for the application to perform intelligent image processing to perform automatic adjustment of the MCA to match the optical characteristics of the MCO device.

20. The computer-implemented system of claim 19, further configured to control a motorized collimation mount to modify the alignment of the MCA.

21. The computer-implemented system of claim 15, further configured for the application to record received MCA data on the smart device.

* * * * *